United States Patent
Hsieh et al.

(10) Patent No.: US 11,768,314 B2
(45) Date of Patent: Sep. 26, 2023

(54) PROJECTION SYSTEM AND METHOD FOR SENSING OCCUPANCY OF A USER AND OBJECTS IN A SPACE

(71) Applicant: Coretronic Corporation, Hsin-Chu (TW)

(72) Inventors: Chi-Tang Hsieh, Hsin-Chu (TW); Chih-Hsien Tsai, Hsin-Chu (TW); Yu-Hsien Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 65 days.

(21) Appl. No.: 17/356,450

(22) Filed: Jun. 23, 2021

(65) Prior Publication Data

US 2022/0018987 A1    Jan. 20, 2022

(30) Foreign Application Priority Data

Jul. 16, 2020 (CN) .......................... 202010685103.1

(51) Int. Cl.
*G01V 9/00* (2006.01)
*G08B 5/22* (2006.01)

(52) U.S. Cl.
CPC ........ *G01V 9/00* (2013.01); *G08B 5/22* (2013.01)

(58) Field of Classification Search
CPC .................... G01V 9/00; G08B 5/22
See application file for complete search history.

(56) References Cited

U.S. PATENT DOCUMENTS

2019/0370575 A1 * 12/2019 Nandakumar ....... G05D 1/0088

FOREIGN PATENT DOCUMENTS

| CN | 203101974 | 7/2013 | |
| WO | WO 2018208805 | * 11/2018 | ............. G01C 21/26 |

* cited by examiner

*Primary Examiner* — Hongmin Fan
(74) *Attorney, Agent, or Firm* — JCIPRNET

(57) ABSTRACT

The invention provides a projection method and system. The method includes providing a first sensing group sensing a space and generating a first sensing result to determine whether a user is in an entering or exiting state relative to the space; providing a second sensing group sensing a first or second object in the space according to the first sensing result and generating a second sensing result; and generating a prompt information according to the second sensing result and displaying the prompt information. The system includes a first sensing group, a second sensing group, and a display device. The method and system of the invention sense the space according to the entering and exiting state of the user to effectively reduce the inspection steps of the user for the space, thereby effectively improving the safety of the space, and improving the operating convenience of the user of the space.

10 Claims, 3 Drawing Sheets

2

PROJECTION SYSTEM AND METHOD FOR SENSING OCCUPANCY OF A USER AND OBJECTS IN A SPACE

CROSS-REFERENCE TO RELATED APPLICATION

This application claims the priority benefit of China application serial no. 202010685103.1, filed on Jul. 16, 2020. The entirety of the above-mentioned patent application is hereby incorporated by reference herein and made a part of this specification.

BACKGROUND OF THE INVENTION

Field of the Invention

The invention relates to a method and an electronic system, and more particularly to a projection method and a projection system.

Description of Related Art

With the development of Internet of Things (IoT) techniques, users increasingly rely on the network to control various electronic devices in the IoT. The existing electronic devices may be controlled by the user to perform corresponding operations. However, the electronic devices may actively sense the state of the user, and then execute corresponding sensing, which is the direction of technological development.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection method and a projection system that may sense the space and objects in the space according to whether the user is in an entering state or exiting state relative to the space, and display prompt information to the user.

Other objects and advantages of the invention may be further understood from the technical features disclosed by the invention.

In order to achieve one or part or all of the above objects or other objects, a projection method of the invention includes providing a first sensing group, wherein the first sensing group senses a space and generates a first sensing result to determine whether a user is in an entering state or an exiting state relative to the space; providing a second sensing group, wherein the second sensing group senses a first object or a second object in the space according to the first sensing result and generates a second sensing result; and generating a prompt information according to the second sensing result and displaying the prompt information.

In order to achieve one or part or all of the above objects or other objects, a projection system of the invention includes a first sensing group, a second sensing group, and a display device. The first sensing group senses a space and generates a first sensing result to determine whether a user is in an entering state or an exiting state relative to the space. The second sensing group senses a first object or a second object in the space according to the first sensing result and generates a second sensing result. The display device generates a prompt information according to the second sensing result and displays the prompt information.

Based on the above, the projection method and the projection system of the invention may correspondingly sense the space according to the entering and exiting states of the user to effectively reduce the inspection steps of the user for the space, thereby effectively improving the safety of the space, and improving the convenience of the user in the operation of the space.

In order to make the above features and advantages of the invention better understood, embodiments are specifically provided below with reference to figures for detailed description as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, features, and effects of the invention will be clearly presented in the following detailed description of a preferred embodiment with reference to the accompanying figures. In addition, the terminology mentioned in the embodiments, such as: up, down, left, right, front, rear, etc., are only directions referring to the figures. Therefore, the directional terms used are used for illustration, not for limiting the invention.

Figure 1:
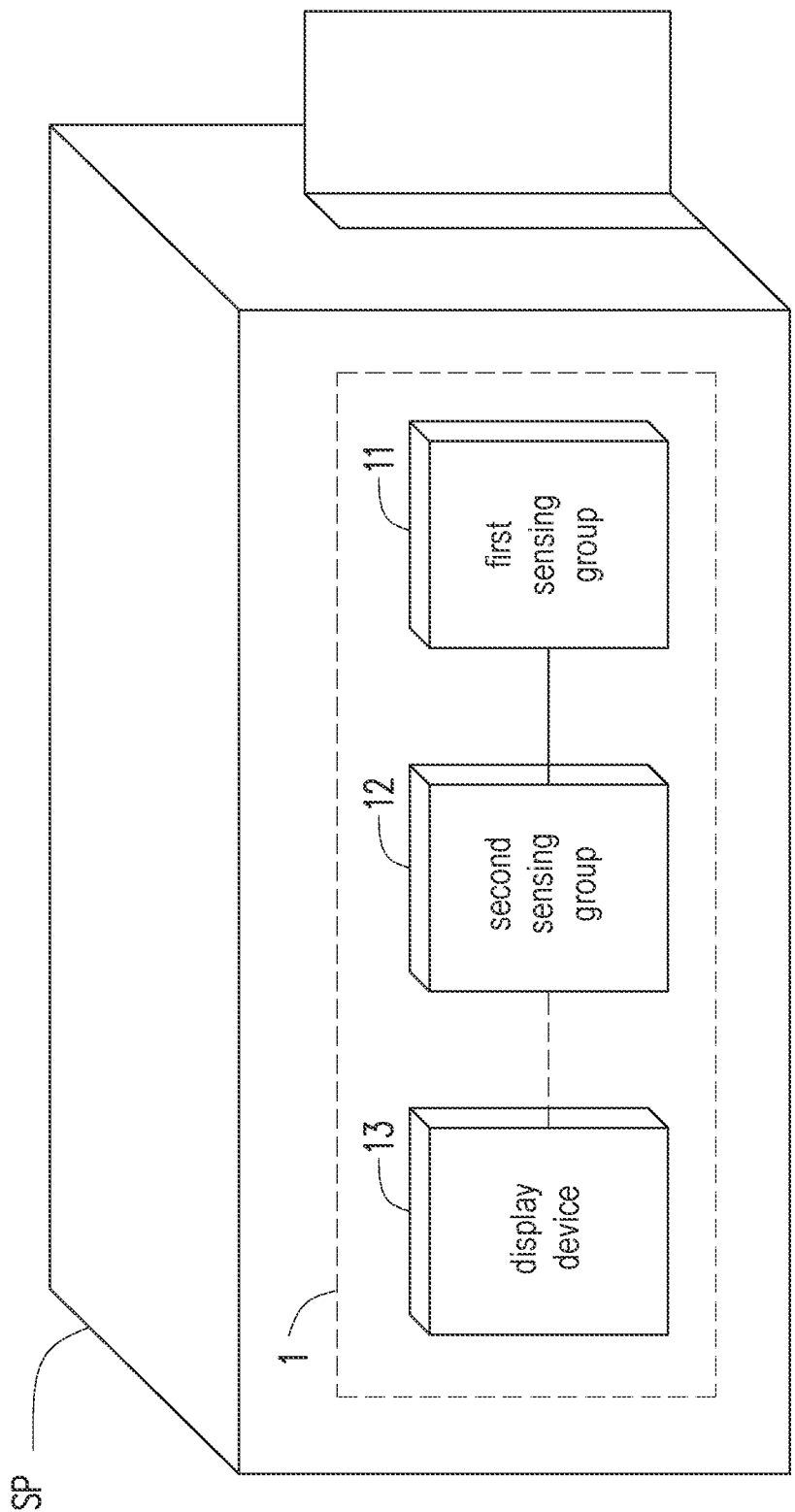
FIG. 1 is a diagram of a projection system of an embodiment of the invention.

Referring to FIG. 1, FIG. 1 is a diagram of a projection system 1 of an embodiment of the invention. The projection system 1 includes a first sensing group 11, a second sensing group 12, and a display device 13. Further, the projection system 1 may perform sensing for a space SP. In detail, the first sensing group 11 may perform sensing on a door or other devices of the space SP, and generate a first sensing result to determine whether a user is in an entering state or an exiting state. The second sensing group 12 is coupled to the first sensing group 11, and the second sensing group 12 may perform corresponding sensing on an object (not shown in FIG. 1) in the space SP according to the first sensing result, and generate a second sensing result. The display device 13 is communicatively connected to the second sensing group 12, and the display device 13 may generate a corresponding prompt information according to the second sensing result and display the prompt information to the user. In the embodiment shown in FIG. 1, the projection system 1 is disposed in the space SP, but the invention is not limited thereto. In other embodiments, the projection system 1 may also be arranged outside the space SP. Alternatively, the projection system 1 may be partially disposed in the space SP, and partially disposed outside the space SP. In some embodiments, the space SP may be a space in a vehicle or a space in a house. The projection system 1 may determine whether the user is in a state of entering or exiting the space SP, perform corresponding sensing of the first object or the second object according to different states, and display a prompt information to the user via the display device 13. Therefore, the projection system 1 may enhance the safety of the space SP and improve the convenience of the user in the operation of the space.

In an embodiment, the projection system 1 may be applied to the space SP in a vehicle. In the embodiment, the first sensing group 11 may sense the door, engine, seat, etc. of the vehicle. The first sensing group 11 may include, for example, a door sensor, an engine speed sensor, a seat pressure sensor, an infrared sensor, etc., or a combination of the above devices. The first sensing group 11 may be a single sensor, or may include a combination of a plurality of same or different sensors. The first sensing group 11 may perform sensing for the door, engine, car seat and other devices of the space SP to determine whether the user is in an entering state or an exiting state relative to the space in the vehicle. For example, when the first sensing group 11 senses that the engine of the vehicle is shut down and the door is opened, it is determined that the user wants to leave the vehicle, and the first sensing result is the exiting state. Similarly, when the first sensing group 11 senses that the door of the vehicle is opened and the lights are turned on, it is determined that the user wants to enter the vehicle, and the first sensing result is the entering state, but the invention is not limited thereto.

In some embodiments, according to the first sensing result, the second sensing group 12 may perform corresponding sensing for various objects in the vehicle and generate a second sensing result, wherein the second sensing result indicates the working state of each object in the vehicle. For example, the objects in the vehicle may include tires, water tanks, batteries, headlights, interior lights, and windows, etc. The second sensing group 12 may include, for example, a tire pressure sensor, a water tank level sensor, a battery voltage/current sensor, a headlight sensor, an interior light sensor, a window sensor, or a combination thereof. The second sensing group 12 may be a single sensor, or may include a combination of a plurality of same or different sensors, but the invention is not limited thereto. For example, when the first sensing result is an entering state, the second sensing group 12 (for example, a tire pressure sensor) senses the first object of the vehicle, such as a tire, to generate a second sensing result. In some embodiments, the second sensing result includes the tire pressure value of the tire.

In some embodiments, the display device 13 is communicatively connected to the second sensing group 12, and may generate a prompt information according to the second sensing result and display the prompt information to the user. The display device 13 may also be further communicatively connected with the first sensing group 11. Furthermore, the display device 13 may be integrated with the first sensing group 11 and the second sensing group 12. Alternatively, the display device 13 may be separately provided from the first sensing group 11 and the second sensing group 12. For example, the display device 13 may include a door projection lamp, a head-up display, a personal digital assistant, a smart phone, a tablet computer, a smart watch, etc., or a combination thereof, but the invention is not limited thereto.

In some embodiments, the projection system 1 may be applied to the space SP in a house. The first sensing group 11 may sense the door of the house or other devices in the house. The first sensing group 11 may, for example, include a door handle sensor, a security system sensor, an infrared sensor, or a combination of the above devices. The first sensing group 11 may sense, for example, the door of a house. By determining which side of the door the user approaches from (for example, the outside of the door is the first side, and the inside of the door is the second side), or determining on which side of the door the user opens and/or closes, whether the user is in an entering state or an exiting state relative to the house may be determined. Further, the objects in the house may include indoor gas components (such as carbon monoxide), gas, windows, gas stoves, etc., for example. The second sensing group 12 may, for example, include a carbon monoxide detector, a gas sensor, a gas stove switch sensor, a window switch sensor, or a combination thereof. In the embodiment, for example, based on the sensing result of the first sensing group 11 (for example, the door is opened from the second side of the house), it is determined that the user wants to exit, and the first sensing result is an exiting state. According to the first sensing result, the second sensing group 12 (for example, a gas stove switch sensor) senses a first object in the house, such as a gas stove, to generate a second sensing result. In some embodiments, the second sensing result includes the on-off state of the gas stove.

In some embodiments, the display device 13 may include a projector, a personal digital assistant, a smart phone, a tablet computer, a smart watch, etc., or a combination thereof, but the invention is not limited thereto.

Figure 2:
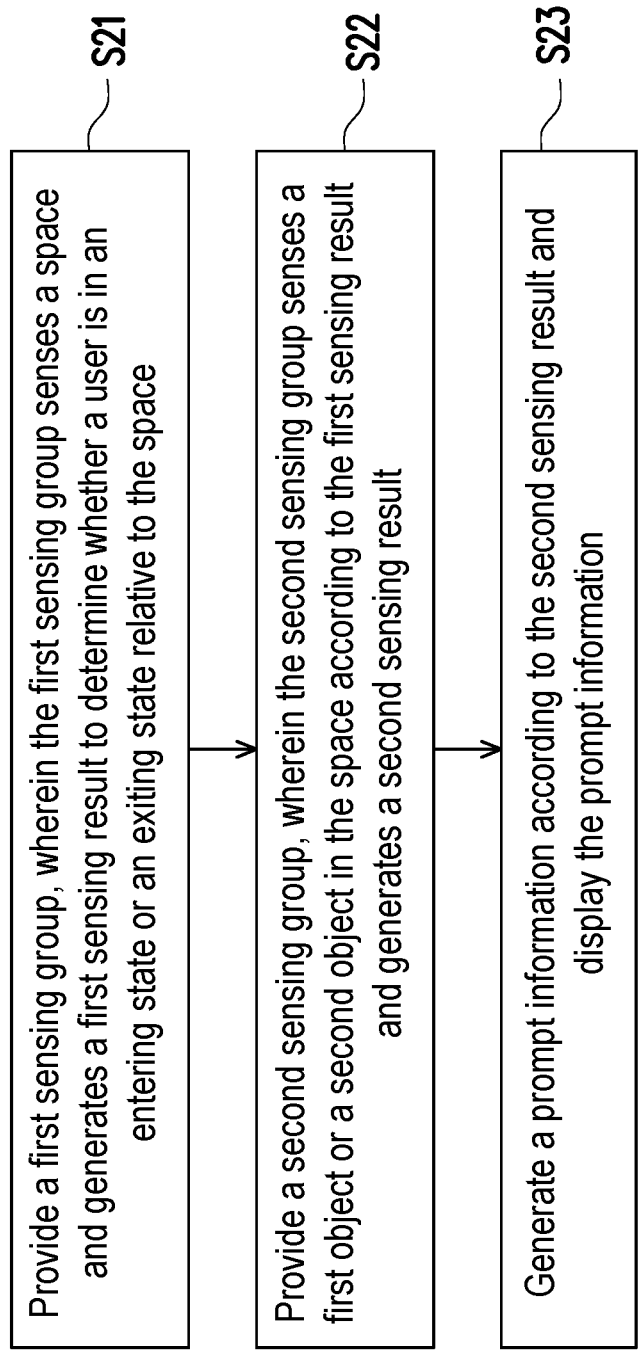
FIG. 2 and FIG. 3 are diagrams of projection methods of embodiments of the invention.
Figure 3:
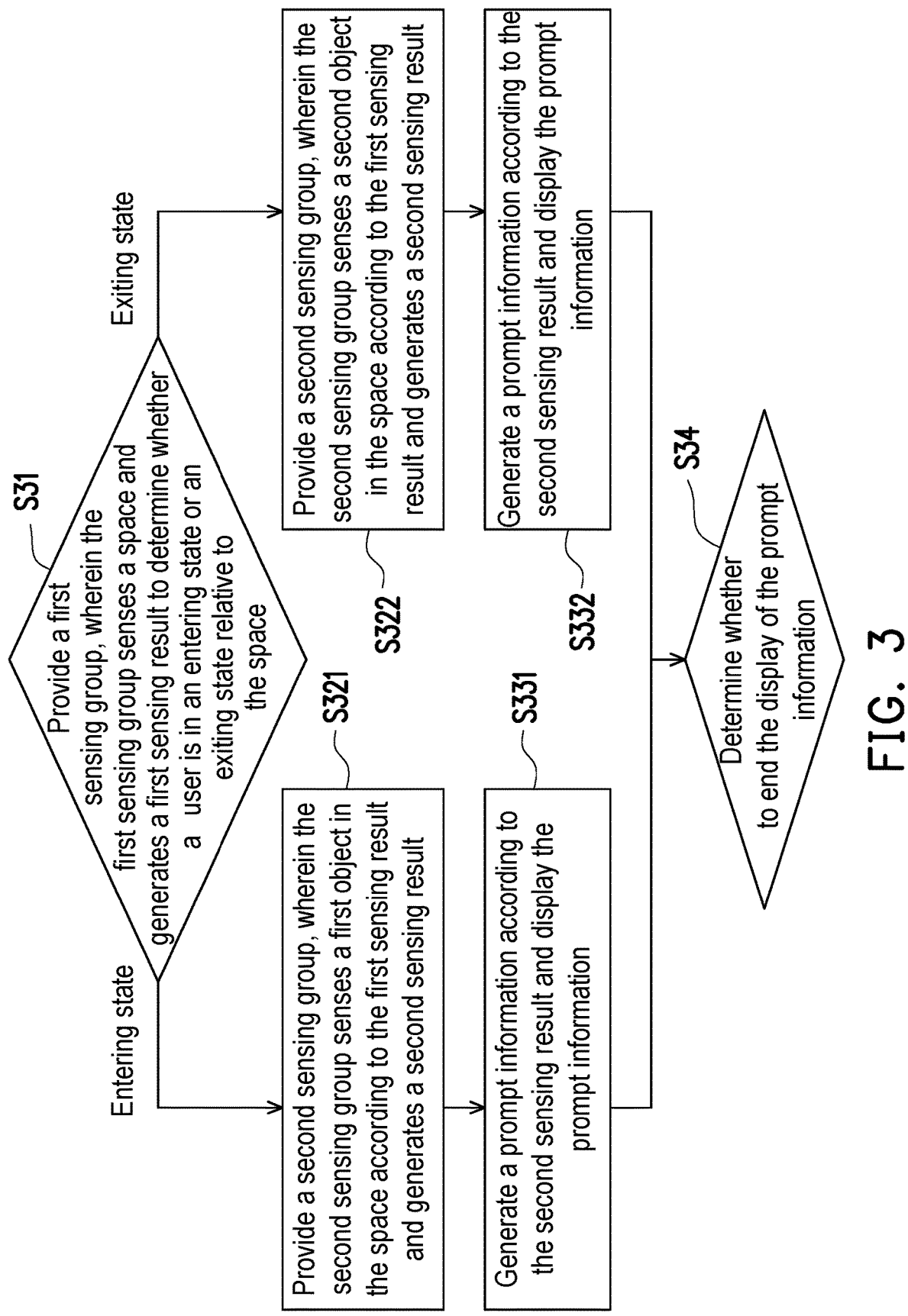

Referring to FIG. 2 and FIG. 3, FIG. 2 and FIG. 3 are diagrams of projection methods of embodiments of the invention. The projection methods shown in FIG. 2 and FIG. 3 may be executed by the projection system 1 shown in FIG. 1, for example.

In step S21, the first sensing group 11 of the projection system is provided. The first sensing group 11 senses the space SP and generates a first sensing result to determine whether the user is in an entering state or an exiting state relative to the space SP. In step S22, the second sensing group 12 of the projection system is provided. The second sensing group senses a first object or a second object in the space SP according to the first sensing result and generates a second sensing result. In step S23, a prompt information is generated according to the second sensing result and the prompt information is displayed.

In the embodiment shown in FIG. 3, in step S31, the first sensing group 11 is provided, wherein the first sensing group 11 senses the space SP and generates a first sensing result to determine whether a user is in an entering state or an exiting state relative to the space SP. In detail, the first sensing group 11 may sense at least the door of the space SP (for example, a car door or a house door), and may also further sense other devices such as an engine or a handle. Based on the first sensing result of the first sensing group 11, the determination result of whether the user is in the entering state or the exiting state relative to the space SP may be obtained.

The detailed description of step S31 is as follows. In an embodiment where the space SP is a space in a vehicle, when the first sensing group 11 senses that the user uses the handle on the outside of the vehicle to open the door, the determination result of an entering state is generated. When the first sensing group 11 senses that the user uses the handle on the inside of the vehicle to open the door, the determination result of an exiting state is generated. Alternatively or additionally, the first sensing group 11 may perform sensing for the engine of the vehicle. In this case, the first sensing group 11 may include an engine speed sensor. When the first sensing group 11 senses the start of the engine after the door is opened, the determination result of the entering state is obtained. When the first sensing group 11 senses that the engine is shut down before the door is opened, the determination result of the exiting state is obtained. The first sensing group 11 may also include an infrared sensor to sense that the user is located inside or outside the space (for example, inside or outside the car, inside or outside the house). When the infrared sensor senses the user's approach outside the space, and the car door or house door is sensed to open, the determination result of the entering state is obtained. Similarly, when the infrared sensor senses the user's approach in the space, and the car door or house door is sensed to open, the determination result of the exiting state is obtained. The situation where the space SP is a space in a house is similar to the situation of the vehicle, and is not repeated herein.

Furthermore, a first preset time may be provided between the two actions of the door opening and engine starting sensed by the first sensing group 11, a second preset time may be provided between the two actions of engine shutdown and door opening, and the first preset time may be the same or different from the second preset time. For example, the first preset time may be 15 seconds, 30 seconds, or 1 minute. The second preset time may be 15 seconds, 30 seconds, or 1 minute, and the invention is not limited thereto.

In other embodiments, the first sensing group 11 may also sense the pressure applied to the seat. In this case, when the first sensing group 11 senses a decrease in the pressure applied to the seat after the door is opened, the determination result of the exiting state is obtained. When the first sensing group 11 senses an increase in the pressure applied to the seat after the door is opened, the determination result of the entering state is obtained.

In step S321, when the entering state is determined, the second sensing group 12 is provided that senses the first object in the space SP and generates a second sensing result. For example, when the entering state is determined, the second sensing group 12 may sense the first object such as a tire. Therefore, a corresponding second sensing result is generated, and the second sensing result may include the result of whether the tire pressure value or the tire pressure is within a preset pressure range. The invention is not limited thereto. In other embodiments, the first object includes a water tank, a battery, carbon monoxide in the space SP, or gas, etc., and the second sensing result includes the result of the water level of a water tank, the voltage/current of a battery, the concentration of carbon monoxide, the concentration of gas, or whether each of the above is within a preset range.

In step S331, the display device 13 generates a prompt information according to the second sensing result, and displays the prompt information. For example, the display device 13 may include a door projection lamp that may project the prompt information on the ground. Alternatively, the display device 13 may include a head-up display that may project the prompt information on the front windshield of the vehicle. The invention is not limited thereto. In other embodiments, the display device 13 may include devices such as personal digital assistants, smart phones, tablet computers, or smart watches. In some embodiments, the prompt information may include tire pressure warning information, water tank water level warning information, battery voltage/current warning information, carbon monoxide concentration warning information, gas concentration warning information, and the like. For example, when it is determined that the tire pressure is not within the preset pressure range, the prompt information includes tire pressure warning information to prompt the user.

In step S322, when the exiting state is determined, the second sensing group 12 is provided that senses the second object in the space SP and generates a second sensing result. For example, when the exiting state is determined, the second sensing group 12 may sense a second object such as a car window or a gas stove, thereby generating a corresponding second sensing result. The invention is not limited thereto. In other embodiments, the second object may be, for example, a headlight, an interior light, a window, a gas stove, a window, etc. The second sensing result includes the results of whether the headlight is turned off, whether the interior light is turned off, whether the window is closed, whether the gas stove is closed, and whether the window is tightly closed.

In step S332, the display device 13 generates a prompt information according to the second sensing result, and displays the prompt information. In some embodiments, the prompt information may include, for example, a warning information that a car window is not closed or an information that a gas stove is not closed. In some embodiments, the prompt information may include, for example, a warning information that the headlight is not turned off, a warning information that the interior light is not turned off, a warning information that the windows is not closed, a warning information that a gas stove is abnormal or not closed, or a warning information that the windows is not closed tightly. For example, when the headlight is not turned off, the prompt information includes information that the headlight is not turned off to prompt the user.

In step S34, the display device 13 determines whether to end the display of the prompt information. Furthermore, the display device 13 may continuously display the prompt information, or may display the prompt information periodically to continuously prompt the user. In an embodiment, the display device 13 may end the display after continuously displaying the prompt information for a preset time to avoid waste of power.

In the above, when the projection system 1 is applied to the space SP of a vehicle or a house, the projection system 1 may generate the first sensing result indicating that the user is in an entering state or an exiting state via the first sensing group 11. The second sensing group 12 may perform corresponding sensing on a first object or a second object according to the first sensing result to generate a second sensing result. The display device 13 may generate a prompt information according to the second sensing result, and display the prompt information to the user. In short, the projection system 1 may correspondingly sense devices or objects in the space SP according to the state of the user to improve overall safety or reduce the inspection steps of the use for the space. Therefore, the projection system 1 may enhance the safety of the space SP and improve the convenience of the user in the operation of the space.

Based on the above, the projection method and the projection system of the invention may sense whether the user is in an entering state or an exiting state relative to the space, so as to sense the devices in the space accordingly, and display the sensing results via the display device of the projection system. The projection system may perform corresponding sensing on the space according to the state of the user. When the inspection steps of the user for the space are reduced, the projection system may effectively improve the safety of the space and improve the convenience of the user in the operation of the space.

The above are only preferred embodiments of the invention, and may not be used to limit the scope of implementation of the invention. That is to say, all simple equivalent changes and modifications made in accordance with the claims of the invention and the content of the specification are still within the scope of the patent of the invention. In addition, any embodiment or claim of the invention does not need to achieve all the objects or advantages or features disclosed in the invention. In addition, the abstract of the specification and the title of the invention are only used to assist the search of patent documents, not to limit the scope of the invention. In addition, terms such as "first" and "second" mentioned in the specification or claims are only used to name the element or to distinguish different embodiments or ranges, and are not used to limit the upper or lower limit of the number of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection method, wherein the projection method comprises:
   providing a first sensing group, wherein the first sensing group senses a space and generates a first sensing result to determine whether a user is in an entering state or an exiting state relative to the space;
   providing a second sensing group, wherein the second sensing group senses a first object or a second object in the space according to the first sensing result and generates a second sensing result; and
   generating a prompt information according to the second sensing result and displaying the prompt information, wherein the step of the second sensing group sensing the first object or the second object in the space according to the first sensing result comprises:
   sensing the first object via the second sensing group when it is determined that the user is in the entering state relative to the space; and
   sensing the second object via the second sensing group when it is determined that the user is in the exiting state relative to the space.

2. The projection method of claim 1, wherein the space is a space in a vehicle, and the step of the first sensing group sensing the space and generating the first sensing result comprises:
   sensing a door and/or an engine of the vehicle via the first sensing group, wherein,
   when the first sensing group senses that the door is opened and senses the engine is started within a first preset time after the door is opened, it is determined that the user is in the entering state relative to the space;
   when the first sensing group senses that the door is opened and senses the engine is when the first sensing group senses that the door is opened and senses the engine is shut down within a second preset time before the door is opened, it is determined that the user is in the exiting state relative to the space.

3. The projection method of claim 2, wherein the first object is a tire, and the step of sensing the first object via the second sensing group comprises:
   sensing a tire pressure of the tire via the second sensing group to determine whether the tire pressure is within a preset pressure range, wherein when it is determined that the tire pressure is not within the preset pressure range, the prompt information contains a tire pressure warning information to prompt the user.

4. The projection method of claim 2, wherein the second object is a headlight, and the step of sensing the second object via the second sensing group comprises:
   sensing whether the headlight is turned off via the second sensing group, wherein when the headlight is not turned off, the prompt information contains an information that the headlight is not turned off to prompt the user.

5. A projection system, wherein the projection system comprises a first sensing group, a second sensing group, and a display device, wherein the first sensing group senses a space and generates a first sensing result to determine whether a user is in an entering state or an exiting state relative to the space;

the second sensing group senses a first object or a second object in the space according to the first sensing result and generates a second sensing result;

the display device generates a prompt information according to the second sensing result and displays the prompt information, wherein, the second sensing group senses the first object when it is determined that the user is in the entering state relative to the space, and the second sensing group senses the second object when it is determined that the user is in the exiting state relative to the space.

6. The projection system of claim 5, wherein the space is a space in a vehicle, and the first sensing group senses a door and/or an engine of the vehicle, wherein when the first sensing group senses that the door is opened and senses the engine is started within a first preset time after the door is opened, it is determined that the user is in the entering state relative to the space;

when the first sensing group senses that the door is opened and senses the engine is when the first sensing group senses that the door is opened and senses the engine is shut down within a second preset time before the door is opened, it is determined that the user is in the exiting state relative to the space.

7. The projection system of claim 6, wherein the first object is a tire, and the second sensing group senses a tire pressure of the tire to determine whether the tire pressure is within a preset pressure range, and when it is determined that the tire pressure is not within the preset pressure range, the prompt information of the display device contains a tire pressure warning information.

8. The projection system of claim 6, wherein the second object is a headlight, and the second sensing group senses whether the headlight is turned off, wherein when the headlight is not turned off, the prompt information of the display device contains an information that the headlight is not turned off.

9. A projection method, wherein the projection method comprises:

providing a first sensing group, wherein the first sensing group senses a space and generates a first sensing result to determine whether a user is in an entering state or an exiting state relative to the space;

providing a second sensing group, wherein the second sensing group senses a first object or a second object in the space according to the first sensing result and generates a second sensing result; and generating a prompt information according to the second sensing result and displaying the prompt information;

wherein the space is a space in a vehicle, and the step of the first sensing group sensing the space and generating the first sensing result comprises:

sensing a door and/or an engine of the vehicle via the first sensing group, wherein, when the first sensing group senses that the door is opened and senses the engine is started within a first preset time after the door is opened, it is determined that the user is in the entering state relative to the space; and when the first sensing group senses that the door is opened and senses the engine is when the first sensing group senses that the door is opened and senses the engine is shut down within a second preset time before the door is opened, it is determined that the user is in the exiting state relative to the space.

10. A projection system, wherein the projection system comprises a first sensing group, a second sensing group, and a display device, wherein the first sensing group senses a space and generates a first sensing result to determine whether a user is in an entering state or an exiting state relative to the space;

the second sensing group senses a first object or a second object in the space according to the first sensing result and generates a second sensing result; and the display device generates a prompt information according to the second sensing result and displays the prompt information;

wherein the space is a space in a vehicle, and the first sensing group senses a door and/or an engine of the vehicle, wherein when the first sensing group senses that the door is opened and senses the engine is started within a first preset time after the door is opened, it is determined that the user is in the entering state relative to the space; and when the first sensing group senses that the door is opened and senses the engine is when the first sensing group senses that the door is opened and senses the engine is shut down within a second preset time before the door is opened, it is determined that the user is in the exiting state relative to the space.

* * * * *